US005894342A

United States Patent [19]
Halup et al.

[11] Patent Number: 5,894,342
[45] Date of Patent: Apr. 13, 1999

[54] IMAGESETTER

[75] Inventors: Nir Halup, Tzoran; Yoav Lichtenstein, Ra'anana; Eliyahu Vronsky, Ramat Hasharon, all of Israel

[73] Assignee: Scitex Corporation Ltd., Herzelia, Israel

[21] Appl. No.: 08/596,762

[22] Filed: Feb. 5, 1996

[51] Int. Cl.[6] .................................................. G03B 27/62
[52] U.S. Cl. ............................................. 355/75; 355/47
[58] Field of Search ................. 399/167, 36; 355/47–49, 355/75

[56] References Cited

U.S. PATENT DOCUMENTS

| | | | |
|---|---|---|---|
| 4,543,615 | 9/1985 | Van Campenhout et al. | 358/285 |
| 4,801,950 | 1/1989 | Frehling | 346/108 |
| 4,961,118 | 10/1990 | Ueda et al. | 358/497 |
| 5,199,701 | 4/1993 | Shioya et al. | 271/272 |
| 5,331,435 | 7/1994 | Scott | 358/479 |
| 5,459,505 | 10/1995 | Ballegaard et al. | 342/260 |
| 5,616,980 | 4/1997 | Zumeris | 310/323 |

*Primary Examiner*—Safet Metjahic
*Assistant Examiner*—John Chizmar
*Attorney, Agent, or Firm*—Wilson Sonsini Goodrich & Rosati

[57] ABSTRACT

Imaging apparatus is provided which includes a generally cylindrical drum defining a substrate support surface, a head operative to record information onto a substrate on the substrate support surface, and substrate feed and position apparatus for precise rotational positioning and displacement of the substrate with respect to an internal surface of cylindrical drum. The apparatus includes a plurality of linear motors arranged along the internal surface of the cylindrical drum for feeding the substrate, and control apparatus for controlling the linear motors to achieve precise positioning of the substrate support surface.

6 Claims, 10 Drawing Sheets

PRIOR ART

IMAGESETTER

FIELD OF THE INVENTION

The present invention relates generally to imagesetters and more particularly to media positioning apparatus for use therein.

BACKGROUND OF THE INVENTION

Conventional scanners and imagesetters commonly employ external or internal drums for media positioning. External drum scanners such as the Scitex ELP external drum scanner, utilize rotary motors of various types for media positioning. The cost of such motors becomes extremely high when highly accurate positioning and repeatability is required.

Internal drum imagesetters, such as for example, the Scitex Dolev 200, utilize pairs of rollers for drawing film out of a film cassette and precise positioning thereof inside a drum.

Precise positioning becomes increasingly difficult as the size of the film to be positioned increases. Roller based positioning systems encounter difficulties in providing consistently precise positioning.

SUMMARY OF THE INVENTION

The present invention seeks to provide improved media positioning apparatus and scanners and imagesetters employing such apparatus.

There is thus provided in accordance with a preferred embodiment of the present invention imaging apparatus including a generally cylindrical support defining a substrate support surface, a head operative to record information onto a substrate on the substrate support surface, and apparatus for precise rotational positioning and displacement of the cylindrical drum with respect to the imaging head. The apparatus includes at least one linear motor arranged to drive the cylindrical support in rotational motion, and control apparatus for providing electrical inputs to the linear motor to achieve precise rotational positioning of the substrate support surface.

Furthermore, in accordance with a preferred embodiment of the present invention, the substrate support surface is supported externally by the drum.

In accordance with a preferred embodiment of the invention, the linear motor apparatus operatively engages the cylindrical surface.

Additionally, in accordance with a preferred embodiment of the present invention, the drum defines at least one flange and the linear motor apparatus operatively engages the flange.

Alternatively, the linear motor may operatively engage an end surface of the cylindrical drum or other support.

As a further alternative, the linear motor may operative engage an axle or other element which is fixed with respect to the cylindrical drum or other support.

Additionally, in accordance with a preferred embodiment of the present invention, the substrate support surface is supported internally by said cylindrical drum.

Furthermore, in accordance with a preferred embodiment of the present invention, the internally supported imaging apparatus further includes substrate feed and positioning apparatus for supplying, positioning and removing the substrate.

Additionally, in accordance with a preferred embodiment of the present invention, the substrate feed and positioning apparatus includes a plurality of linear motors distributed along the support surface in operative engagement with the cylindrical support and control apparatus for providing electrical inputs to the linear motors to achieve precise feed and positioning of the substrate with respect to the substrate support surface.

Additionally, in accordance with a preferred embodiment of the present invention, the linear motors are arranged in multiple juxtaposed pairs which are operative to displace a substrate interposed therebetween. The linear motor is a ceramic linear motor or alternatively a high precision ceramic linear motor.

There is also provided in accordance with a preferred embodiment of the present invention imaging apparatus including a non-cylindrical support defining a substrate support surface, a head operative to record information with onto a substrate on the substrate support surface, and at least one linear motor arranged to drive the cylindrical support in rotational motion, and control apparatus for providing electrical inputs to the linear motor to achieve precise rotational positioning of the substrate support surface.

In accordance with a preferred embodiment of the invention, the linear motor apparatus operatively engages the non-cylindrical surface.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
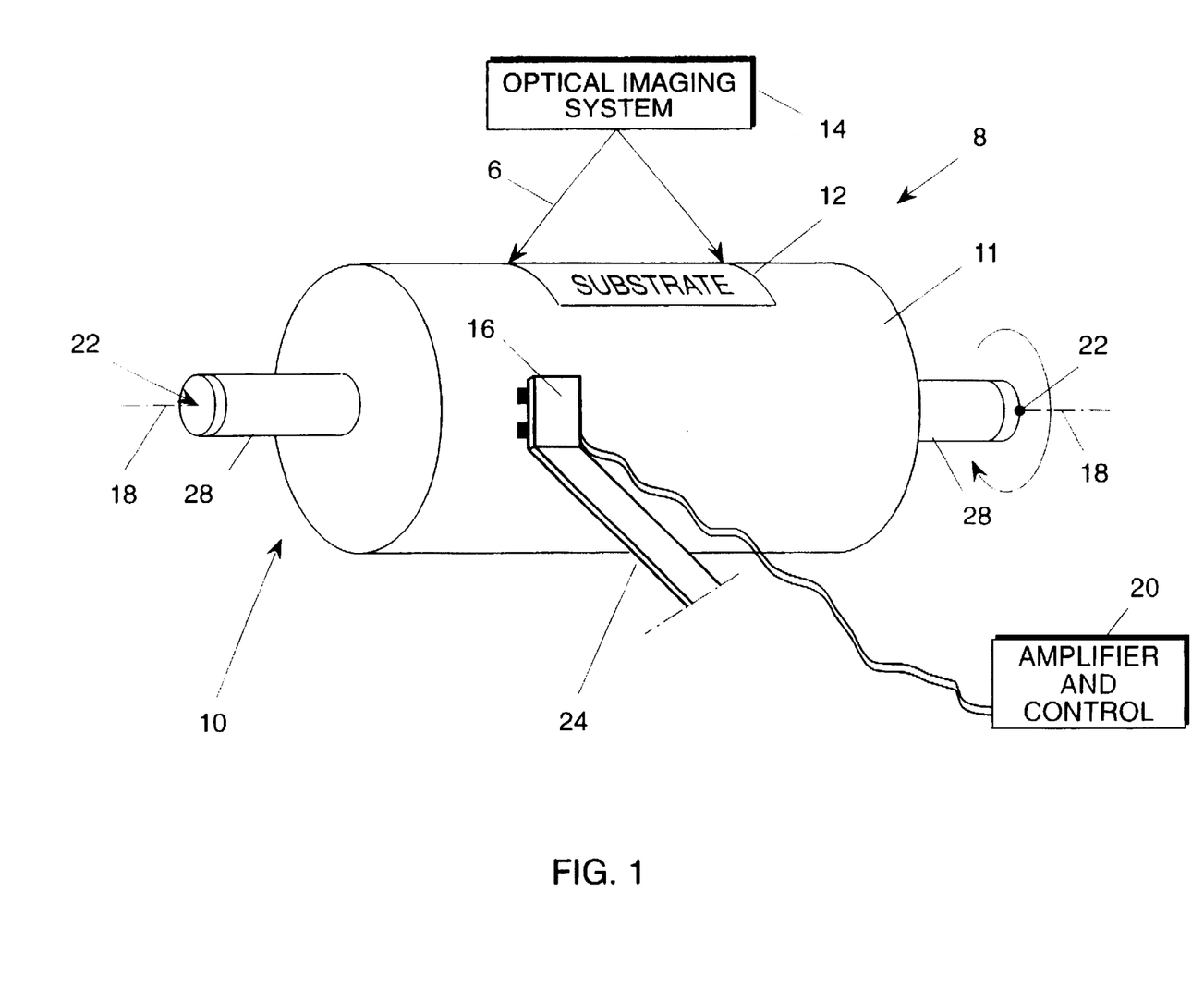
FIG. 1 is a simplified illustration of an external imagesetter/scanner constructed and operative in accordance with a preferred embodiment of the present invention.

Reference is now made to FIG. 1, which illustrates an external imagesetter/scanner constructed and operative in

3 accordance with a preferred embodiment of the present invention. The external imagesetter/scanner 8 comprises a cylindrical support 10, such as a drum, which defines a cylindrical surface 11 onto which a substrate 12, such as a picture, in the case of scanners, or a film or light sensitive plate, in the case of imagesetters, is mounted for imaging by an optical imaging system 14, as shown by the cone of radiation 6. The support 10 is mounted on a shaft 28 and pivoted about an axis 18 by an external support bearing 22.

In accordance with a preferred embodiment of the present invention a linear motor 16 is arranged in driving engagement with a portion of the cylindrical surface 11. The linear motor 16 is held in position on surface 11 by an external support assembly 24. In accordance with a preferred embodiment of the invention, the linear motor 16, such as a piezo-ceramic linear motor, which is commercially available under the catalog designation LN 2000 from Nanomotion Ltd. of Gutwirth Park, Technion, Haifa, Israel, can be used. The linear motor 16 is positioned so as to provide high resolution rotation of the cylindrical surface 11 about the axis 18 in response to electrical signals received from control circuitry 20.

Control circuitry 20 typically includes a voltage and frequency controlled amplifier and synchronizes the rotation of the cylindrical surface 11 with the operation of imaging system.

In all further embodiments of the present invention, like reference numerals refer to like elements of the invention, unless indicated otherwise.

Figure 2:
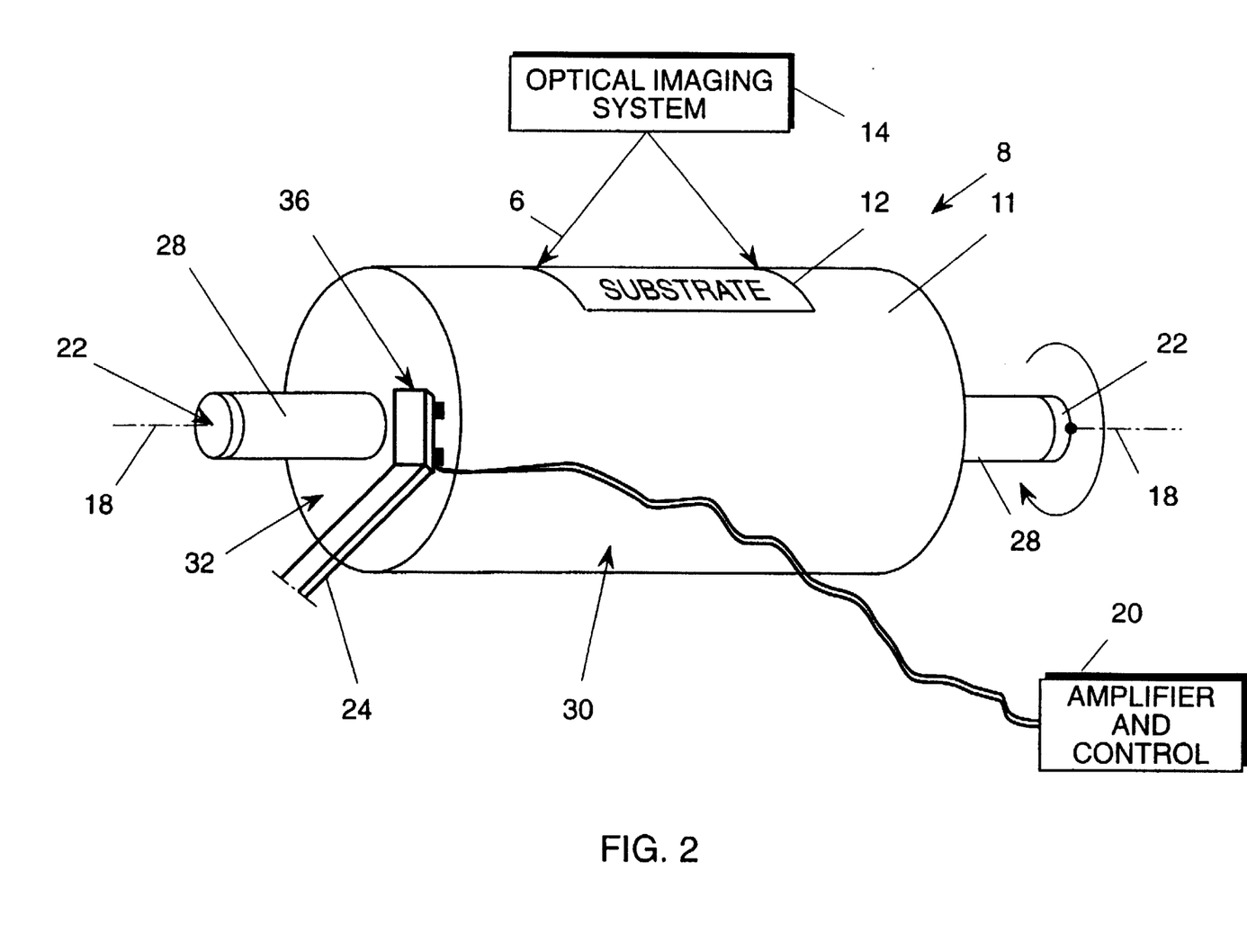
FIG. 2 is a simplified illustration of an external imagesetter/scanner constructed and operative in accordance with another preferred embodiment of the present invention.

Reference is now made to FIG. 2, which is a simplified illustration of an external imagesetter/scanner constructed and operative in accordance with another preferred embodiment of the present invention. The apparatus of FIG. 2 is essentially the same as that of FIG. 1, except in that the cylindrical support, here indicated by reference numeral 30 is formed with a flange 32. In this embodiment, the linear motor is in operative driving engagement with the flange, preferably on the underside thereof. The remainder of the system may be identical to that described hereinabove in connection with FIG. 1.

Figure 3:
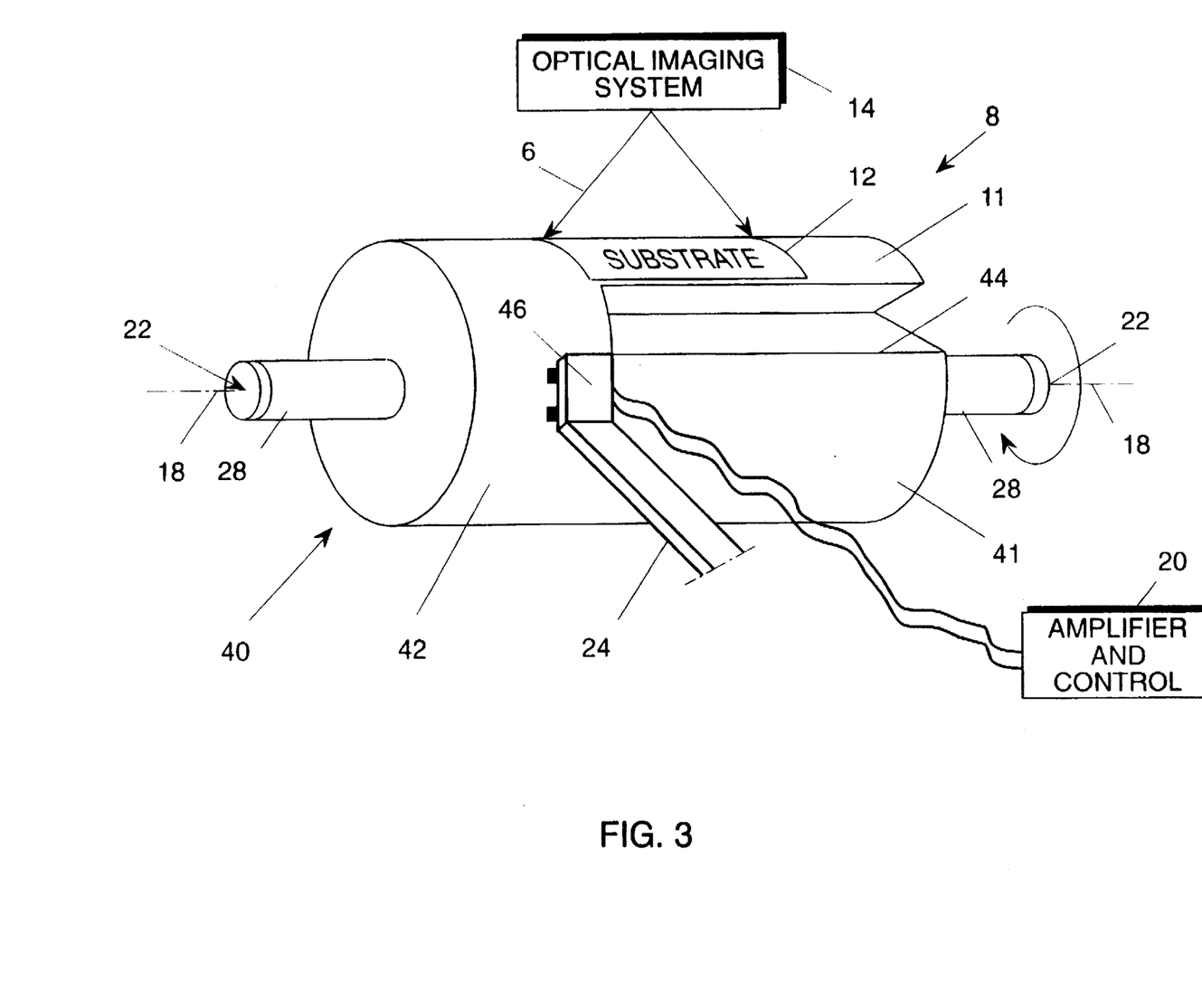
FIG. 3 is a simplified illustration of an external imagesetter/scanner constructed and operative in accordance with another preferred embodiment of the present invention.

Reference is now made to FIG. 3, which is a simplified illustration of an external imagesetter/scanner constructed and operative in accordance with another preferred embodiment of the present invention. The apparatus of FIG. 3 is essentially the same as that of FIG. 1, except in that the cylindrical support, here indicated by reference numeral 40 is formed with a wedge-shaped opening 44 cut into the surface 41. In this embodiment, the linear motor 46 is in operative driving engagement with one of the end portions 42 of the cylindrical support 40. The remainder of the system may be identical to that described hereinabove in connection with FIG. 1.

Figure 4:
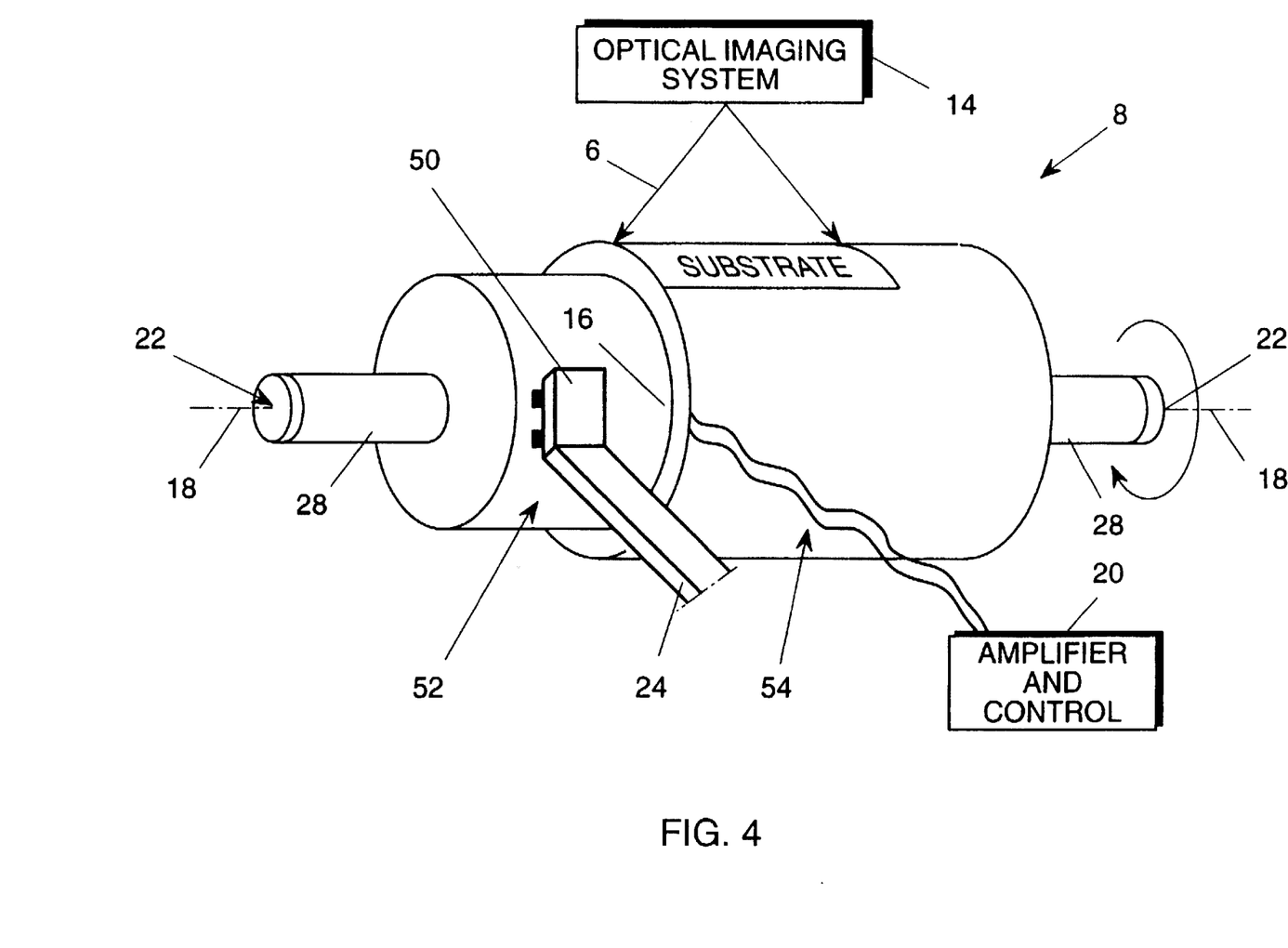
FIG. 4 is a simplified illustration of an external plotter/scanner constructed and operative in accordance with another preferred embodiment of the present invention.

Reference is now made to FIG. 4, which is a simplified illustration of an external imagesetter/scanner constructed and operative in accordance with another preferred embodiment of the present invention. The apparatus of FIG. 4 is essentially the same as that of FIG. 1, except in that the linear motor, here indicated by reference numeral 50 is in operative driving engagement with a shaft 52 onto which the cylindrical support, here indicated by reference numeral 54, is fixedly mounted. The remainder of the system may be identical to that described hereinabove in connection with FIG. 1.

Figure 5:
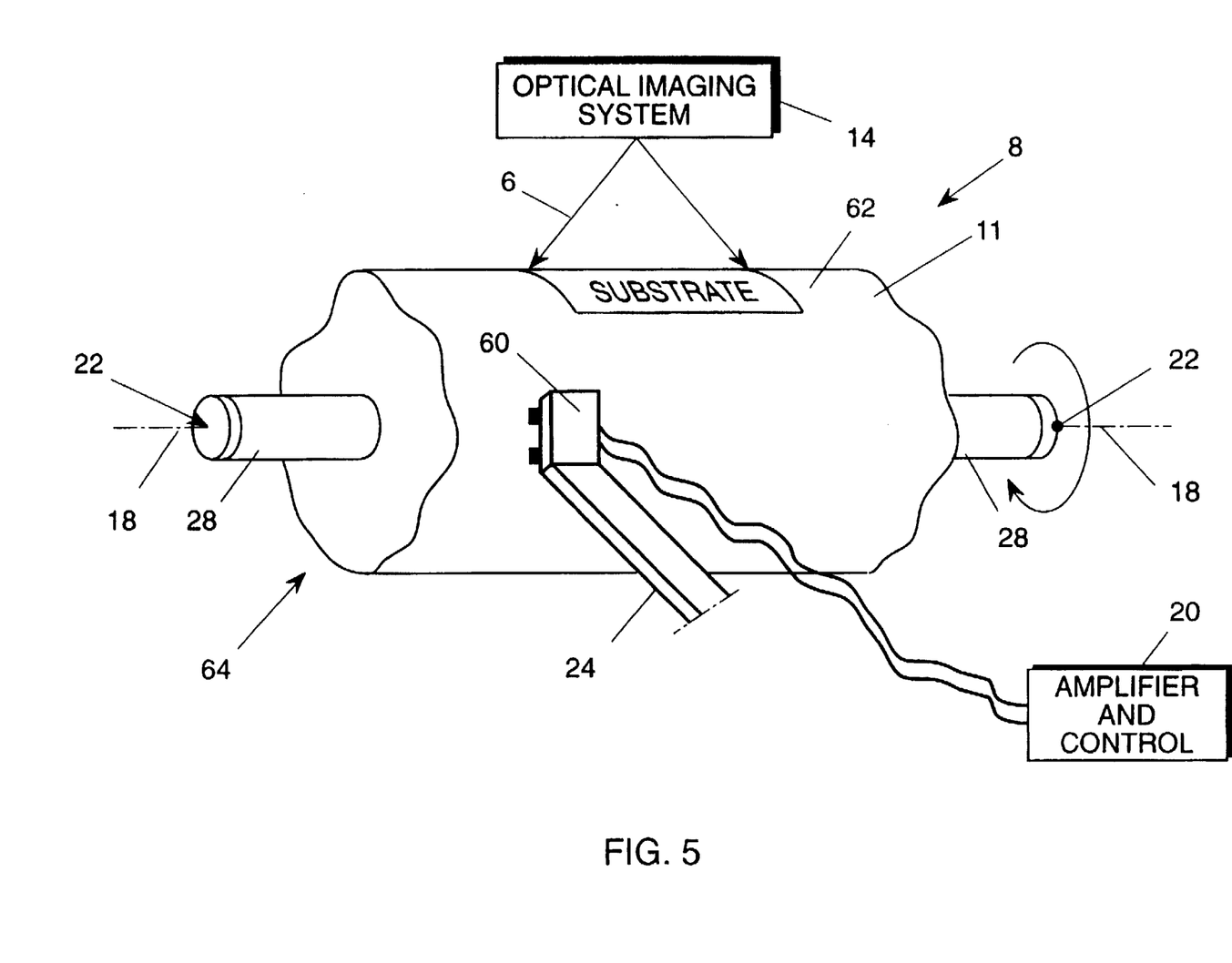
FIG. 5 is a simplified illustration of an external imagesetter/scanner constructed and operative in accordance with yet another preferred embodiment of the present invention.

Reference is now made to FIG. 5, which is a simplified illustration of an external imagesetter/scanner constructed and operative in accordance with another preferred embodiment of the present invention. The apparatus of FIG. 5 is essentially the same as that of FIG. 1, except that the imagesetter 8 comprises a support 64, with a drum of non-circular cross-section, and defines a non-cylindrical support surface 62, such as that illustrated in the drawing. In this embodiment, the linear motor, here indicated by reference numeral 60, is in operative driving engagement with the non-cylindrical support surface 62. The remainder of the system may be identical to that described hereinabove in connection with FIG. 1.

Figure 6:
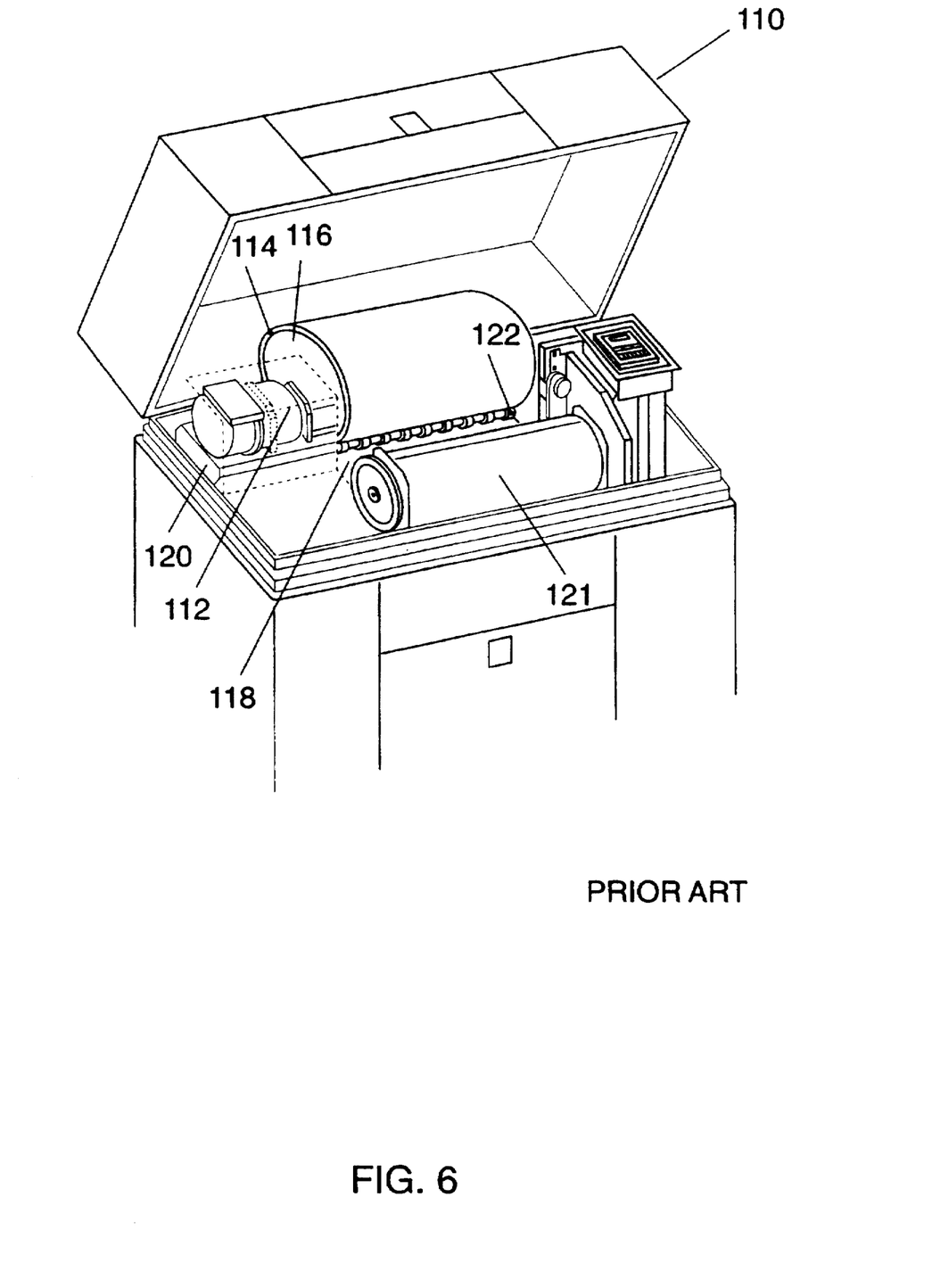
FIG. 6 is a simplified illustration of an internal imagesetter of the prior art incorporating the substrate advance positioning apparatus of the prior art.
Figure 7:
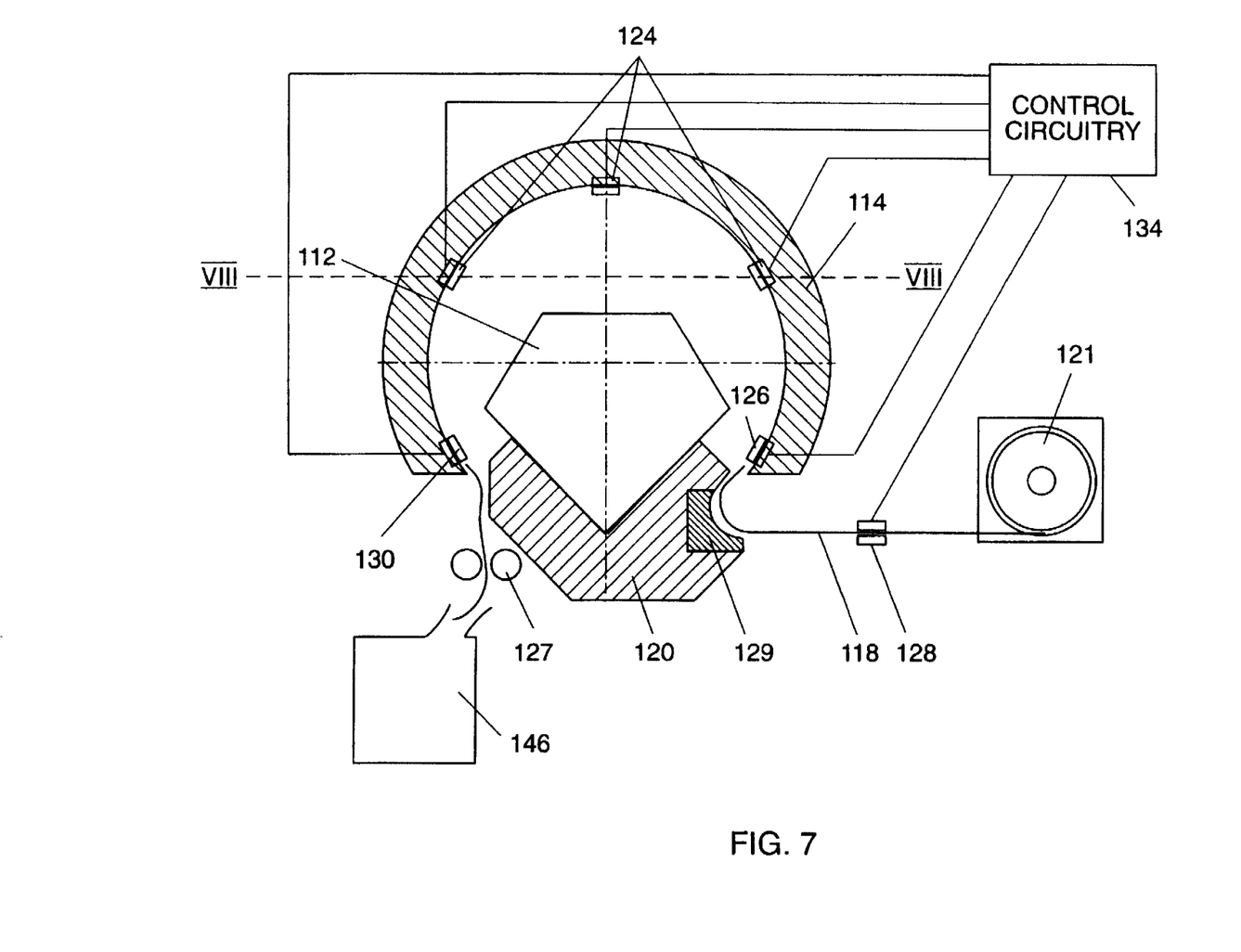
FIG. 7 is a simplified side view sectional illustration of part of an internal drum imagesetter, incorporating substrate advance and positioning apparatus, constructed and operative in accordance with a preferred embodiment of the present invention.
Figure 8:
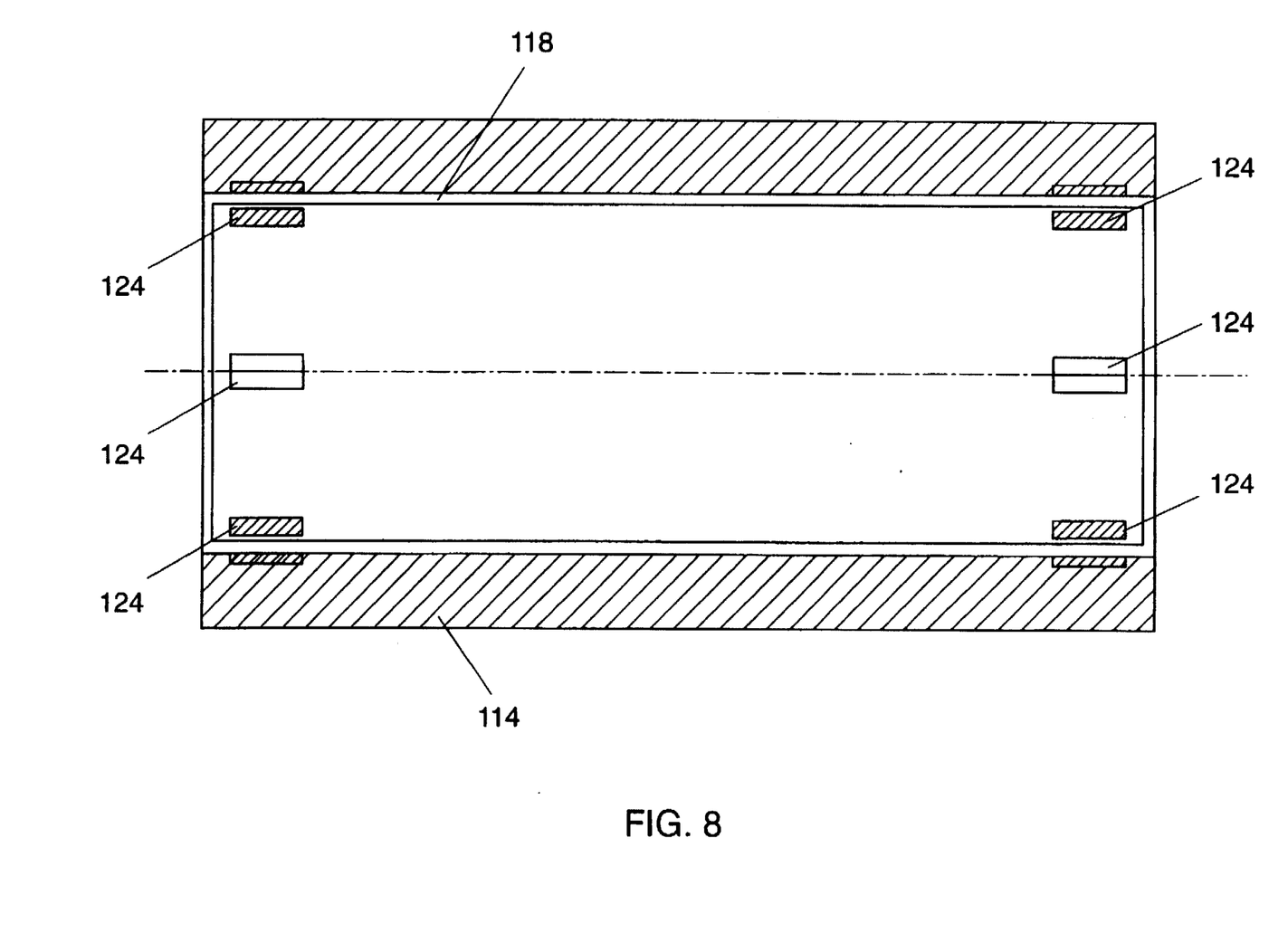
FIG. 8 is a cross-sectional illustration taken along lines VIII—VIII in FIG. 7.
Figure 9:
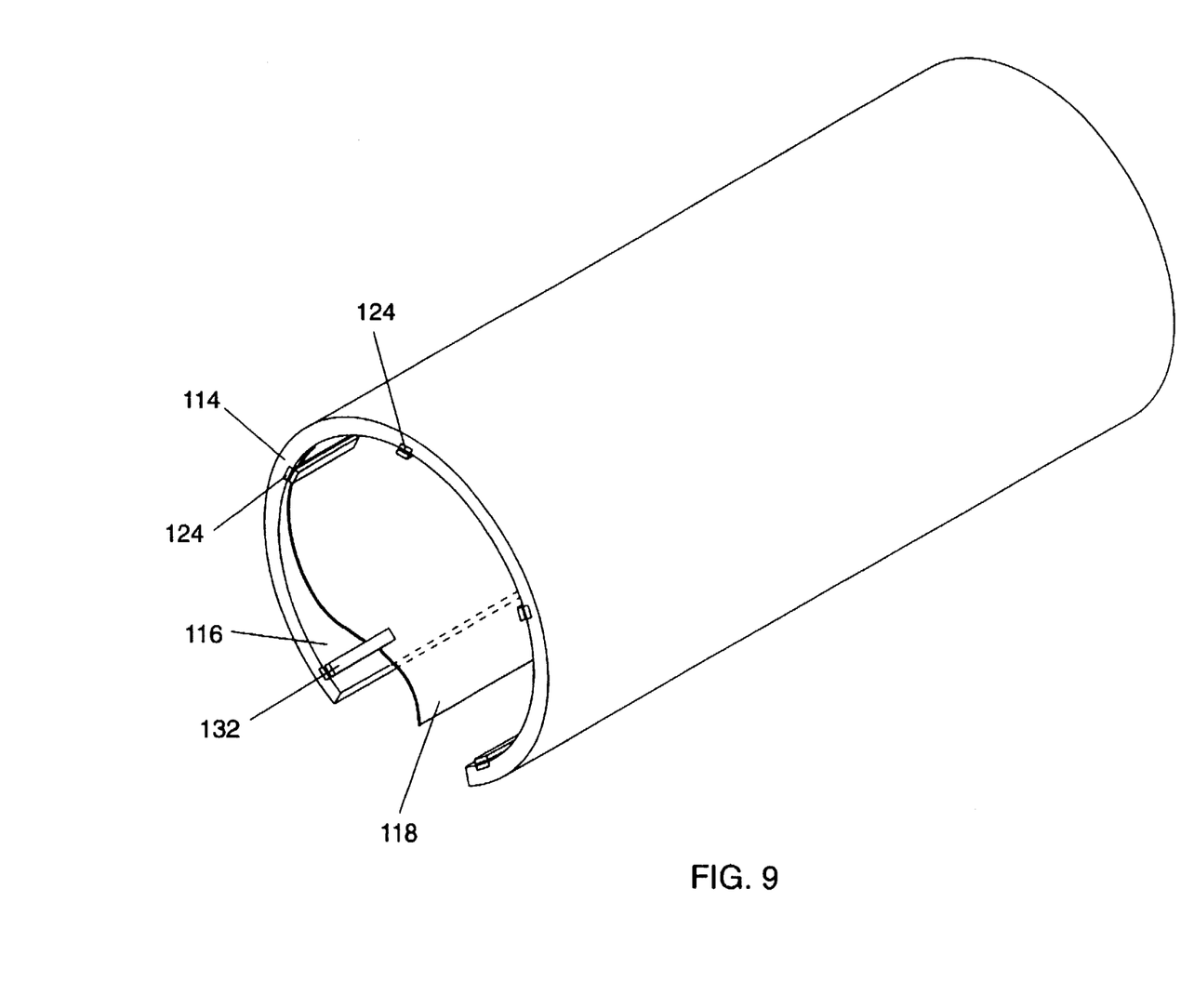
FIG. 9 is a pictorial illustration of part of the apparatus of FIGS. 7 and 8 demonstrating the improper positioning of the substrate.
Figure 10:
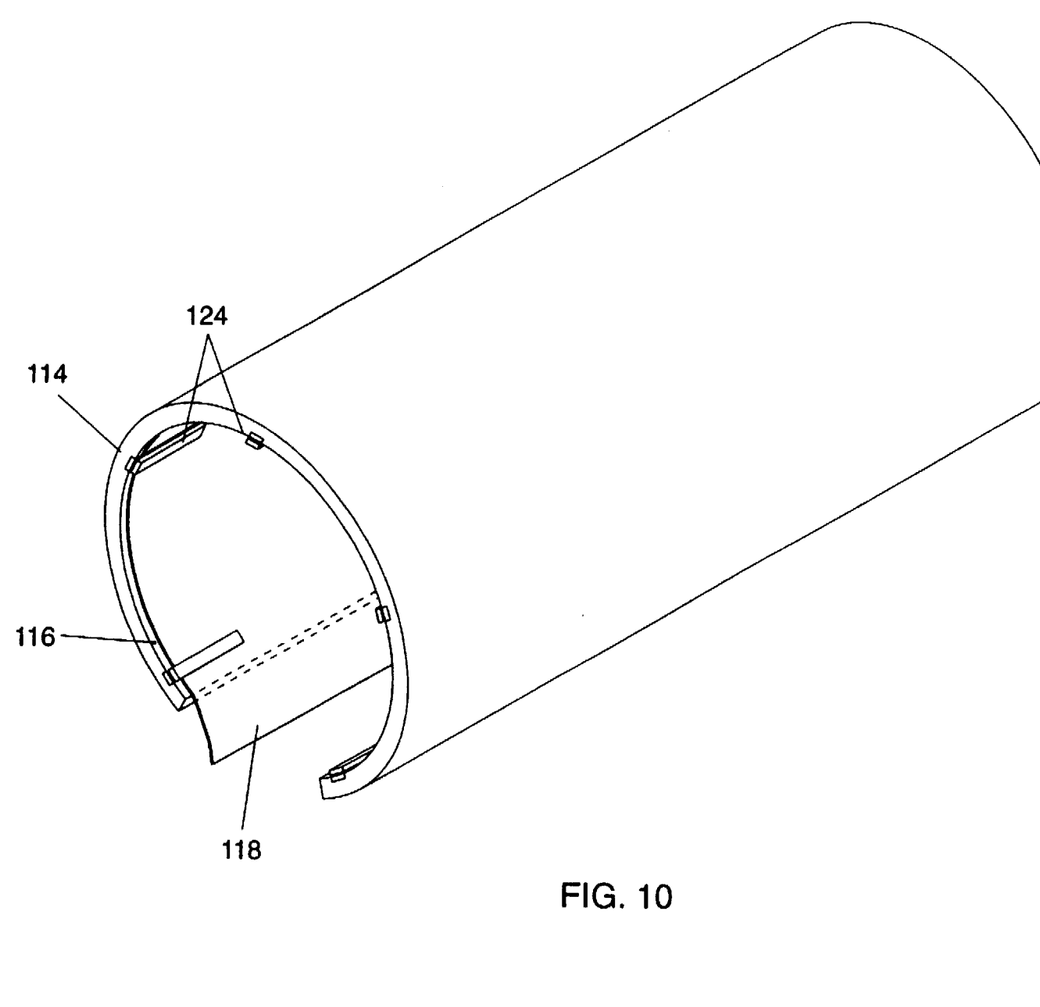
FIG. 10 is a pictorial illustration of part of the apparatus of FIGS. 7 and 8 demonstrating the corrected positioning of the substrate.

Reference is now made to FIGS. 6–10, which illustrate imaging apparatus using internal drum imagesetters. FIG. 6, illustrates a prior art internal drum imagesetter. FIG. 7 is a simplified side view sectional illustration of part of an internal drum imagesetter, incorporating substrate advance and positioning apparatus, constructed and operative in accordance with a preferred embodiment of the present invention. FIG. 8 is a cross-sectional illustration taken along the drum (lines VIII—VIII in FIG. 7), showing how the linear motors 124 drive the film 118 inside the drum 114. FIGS. 9 and 10 are pictorial illustrations of part of the apparatus of FIGS. 7 and 8 demonstrating the improper and correct positioning, respectively, of the substrate.

Reference is now made to FIG. 6, which illustrates a prior art internal drum imagesetter, generally indicated by reference numeral 110. The plotter comprises a plotting head 112 which is disposed within a generally cylindrical drum 114, onto an interior cylindrical surface 116 of which a substrate, such as unexposed film 118 is precisely positioned. The plotting head 112 translates within the drum 114 along a guide rail 120 so as to imagewise expose the film 118 to a light beam.

The film 118 is preferably supplied from a cassette 121 in which a roll or plural sheets of the film are stored and is mechanically fed therefrom to the interior of drum 114 in precisely positioned engagement with interior surface 116, typically via rollers 122.

The present invention is principally concerned with a mechanism by means of which the film 118 is removed from the cassette 121, transported therefrom to the interior of drum 114 and precisely positioned in intimate engagement with the interior surface 116 thereof.

In accordance with a preferred embodiment of the present invention, as seen with particular reference to FIG. 7, the mechanism by means of which the film 118 is removed from the cassette 121, transported therefrom to the interior of drum 114 and precisely positioned in intimate engagement with the interior surface 116 comprises a plurality of linear motors 124.

In accordance with a preferred embodiment of the invention at least one and preferably a plurality of facing juxtaposed pairs of linear motors 124 are distributed along the interior surface 116 of drum 114 for engagement with opposite side edges of film 118, as illustrated in FIG. 8. Additional juxtaposed pairs 126 and 130 of linear motors may be located adjacent the entry and exit locations of drum 114 and further juxtaposed pairs of linear motors 128 may be arranged outside of drum 114 for transporting the film 118 from the cassette 121 to the drum 114.

In accordance with a preferred embodiment of the invention, the linear motors 124, 126, 128 and 130 each comprise a ceramic linear motor, such as a motor which is commercially available under the catalog designation LN 2000 from Nanomotion Ltd. of Gutwirth Park, Technion, Haifa, Israel. The linear motors are positioned to engage the film 118 therebetween and are operated in a synchronized manner in response to electrical signals received from control circuitry 134.

In accordance with a preferred embodiment of the present invention, and as seen with particular reference to FIG. 7, the linear motors 128 feed film 118 from the interior of cassette 121 into operative driving engagement with the bending element 129. The bending element 129 guides the film 118 into engagement with juxtaposed linear motors 126.

Synchronized operation of pairs 126 and 128 as well as of pairs 124 are operative to position, with high precision, the film 118 along the interior surface 116 of drum 114. In accordance with one embodiment of the invention, in order to provide tight engagement between the film 118 and the interior surface 116, juxtaposed pairs 124 may be deactivated and pairs 126 and 130, respectively located adjacent the entry and exit locations of drum 114, are driven in opposite directions, such as to "compress" the film 118 and force it into intimate engagement with the interior surface 116.

Following exposure of the film 118, juxtaposed linear motor pairs 130 adjacent the exit location of drum 114 are operative to remove the film 118 from the drum 114 and to feed it to a suitable receptacle 146 via the rollers 127.

It is to be noted that although the linear motors 124, 126, 128, and 130, may be operative for single axis translation, alternatively linear motors having two-dimensional translation capabilities may be used to advantage in this application.

It is further noted that the apparatus of the present invention is not limited to translation of film, but is equally applicable to positioning and translation of other web materials, such as paper and printing plates.

It is further appreciated that by locating the linear motors 124 in mutually perpendicular orientations, two-dimensional translation and displacement of web substrates, including rotation or other steering, can be achieved. The effect of steering or positioning the film 118 on the inside surface 116 of the drum 114 is illustrated in FIGS. 9 and 10.

FIG. 9 shows the film 118 improperly positioned in the drum 114. The set of linear motors 124, position the film 118 onto the inside surface 116. The film 118 is held in place by the guides 132, as illustrated in FIG. 10.

It will be appreciated by persons skilled in the art that the present invention is not limited to what has been particularly shown and described hereinabove. Rather the scope of the invention is defined only by the claims which follow:

We claim:

1. An internal drum imagesetter for imaging a substrate positioned along an internal surface of a drum, said drum having a longitudinal axis, said internal drum imagesetter comprising:

a. a plotting head for transferring information to said substrate; and b. a substrate feed and positioning assembly for supplying, positioning and removing a substrate, comprising:

a plurality of linear motors distributed along the internal surface of said drum for feeding the substrate along the internal surface; and a controller for controlling said plurality of linear motors to feed and position the substrate with respect to said internal surface of the drum.

2. Apparatus according to claim 1 and wherein said plurality of linear motors is arranged in multiple juxtaposed pairs which are operative to displace a substrate interposed therebetween.

3. Substrate feed and positioning apparatus for use in an imagesetter for supplying, feeding, positioning and removing a substrate, said substrate positioned along a substrate support surface, said substrate support surface having a longitudinal axis, said imagesetter comprising:

a plurality of linear motors distributed along an internal surface of said substrate support surface for feeding the substrate along the substrate support surface; and a controller for controlling said plurality of linear motors to feed and position the substrate with respect to the substrate support surface.

4. Apparatus according to claim 3 and wherein said plurality of linear motors is arranged in multiple juxtaposed pairs which are operative to displace a substrate interposed therebetween.

5. Substrate feed and positioning apparatus for supplying, feeding, positioning and removing a substrate, said substrate positioned along a substrate support surface, said apparatus comprising:

a plurality of linear motors distributed along a support surface for feeding the substrate along the support surface; and a controller for controlling said plurality of linear motors to feed and position the substrate with respect to the substrate support surface.

6. Apparatus according to claim 5 and wherein said plurality of linear motors is arranged in multiple juxtaposed pairs which are operative to displace a substrate interposed therebetween.

* * * * *